United States Patent [19]
Dimmock

[11] Patent Number: 5,605,043
[45] Date of Patent: Feb. 25, 1997

[54] GAS OPERATED EJECTION SYSTEM

[75] Inventor: Ivan H. Dimmock, Avon, Great Britain

[73] Assignee: Meggitt (UK) Limited, Cowgrove, United Kingdom

[21] Appl. No.: 462,567

[22] Filed: Jun. 5, 1995

Related U.S. Application Data

[63] Continuation of Ser. No. 48,877, Apr. 16, 1993, abandoned.

[30] Foreign Application Priority Data

Apr. 16, 1992 [GB] United Kingdom .................. 9208381

[51] Int. Cl.$^6$ ........................... F16D 31/02; G05D 11/00
[52] U.S. Cl. ............................... 60/407; 60/413; 91/447; 91/459; 137/116.5
[58] Field of Search ............................ 60/407, 408, 412, 60/411, 413, 417, 370; 91/518, 517, 446, 417, 461, 447; 137/116.5; 251/31

[56] References Cited

U.S. PATENT DOCUMENTS

| 4,075,928 | 2/1978 | Bitonti ................................. 91/447 X |
| 4,444,085 | 9/1989 | Dragonuk . |
| 4,616,476 | 10/1986 | Oneyama et al. . |

FOREIGN PATENT DOCUMENTS

| 284107 | 1/1928 | United Kingdom . |
| 1082646 | 9/1967 | United Kingdom . |
| 1352068 | 5/1971 | United Kingdom . |
| 2009374 | 6/1979 | United Kingdom . |

Primary Examiner—Hoang Nguyen
Attorney, Agent, or Firm—Wallenstein & Wagner, Ltd.

[57] ABSTRACT

A gas operated release or ejection system which compensates for changes in pressure applied to a load being ejected. The pressure regulator compensates for decreases in pressure through a pressure regulating valve, and compensates for increases in pressure through a pressure relief valve.

29 Claims, 5 Drawing Sheets

GAS OPERATED EJECTION SYSTEM

This application is a file-wrapper continuation application of U.S. application Ser. No. 08/048877 filed Apr. 16, 1993, now abandoned.

BACKGROUND OF THE INVENTION

The present invention relates to gas operated ejection or release systems, and particularly though not exclusively to a system for ejecting loads from an aircraft.

It is an object of the present invention to provide a gas-operated release or ejection system in which changes in output pressure due to temperature and supply pressure variations are reduced.

SUMMARY OF THE INVENTION

According to the present invention, there is provided a gas operated release or ejection system comprising a pressure vessel arranged to discharge along a pathway including a pressure regulating valve, a pressure relief valve and a control valve to a release or ejection mechanism. The ejection mechanism may conveniently comprise an ejection piston, the speed of travel of which is related to the speed at which the load is ejected.

Conveniently, the control valve may be solenoid actuated to move between a closed position and an open position on receipt of an electrical signal. It is desirable for a control valve member to have to move only a small distance between the closed and open positions, but for this movement to create a large effective aperture in the pathway to the ejection mechanism in the open position. This is because it is necessary to allow a large volume of gas to pass in a very short period in which only a relatively small movement of the valve member is practicable.

To prevent leakage through the pressure regulating valve increasing the pressure excessively on the downstream side, the pressure regulating valve may have a compliant or resilient seal, for example a compliant or resilient valve seat. Suitable material would be a polyimide, such as the material known as Vespel (Trade Mark). This has an acceptably low creep rate.

The control valve may comprise a valve body and pressure responsive means at least partially defining first and second chambers, having first and second inlet ports, respectively, defined in the valve body; a valve assembly to open with and to control fluid flow from the first inlet port, the valve assembly being actuated in response to movement of the pressure responsive means; and an auxiliary valve operable to communicate the pressure at the first inlet port to the second inlet port to move the pressure responsive element to open the valve assembly.

The pressure responsive means could be any arrangement which reacts to a change in pressure by movement. For example, the pressure responsive means are preferably a piston and cylinder arrangement. As an alternative, the pressure responsive means could be a bellows arrangement by which one chamber is isolated from the other.

As, in use, the control pressure is applied at the inlet port, it maintains the pressure responsive means in a position in which the control valve is closed. To achieve this, the pressure applied to the pressure responsive means acts on a area that is greater than the area of the control valve exposed to the same pressure. Thus, once the same pressure is applied to the second inlet port, it neutralises the force applied by the same pressure in the first chamber as it acts on an equivalent area. In this condition the pressure on the second chamber is able to open the control valve in the absence of any net counteracting force acting on the piston or other pressure responsive means.

Preferably, the valve assembly includes a valve member and a valve seat, the valve member engaging the valve seat by means of an engaging region that faces in the opposite direction to the control flow of fluid through the valve.

The valve seat is preferably an annular ridge which defines an outlet from the valve. Alternatively, the valve arrangement could be a flat valve. However, in the context of the systems described, it is desirable to achieve an optimum flow rate of gas in a very short space of time (a matter of milliseconds). Thus, the obstruction presented by a flat valve may be unsuited to some situations.

The pressure regulating valve and the pressure relief valve may be combined into a single assembly. In this regard, a suitable combination of a pressure regulating valve and a downstream relief valve comprises a valve body defining an inlet port communicating with an inlet chamber upstream of a regulating valve assembly which includes a valve member and an associated valve seat, an outlet port communicating with an outlet chamber downstream of the valve assembly, the combination further including a regulating mechanism having a movable member responsive to changes in pressure at the outlet port for actuating the valve assembly to regulate the outlet pressure, and a relief valve associated with a regulating mechanism and communicating with the outlet chamber, which relief valve is actuable, by movement of the movable member of the regulating mechanism, to open when the pressure at the outlet exceeds a predetermined magnitude.

Preferably, the valve assembly comprises a valve seat, defining a passage between the inlet and outlet chambers, and a valve member arranged to close by engaging the valve seat by its movement in the direction of fluid flow to the outlet chamber, the valve member having a projecting nose extending through the aperture which is operably connected with the regulating mechanism. The valve member is preferably biased to the closed position, for example, by a spring. Alternatively, or additionally the said valve member may have a hollow axially projecting piston extending in a direction opposite to that of the nose defining, with a surrounding cylinder, a chamber exposed to the regulated outlet pressure to bias the valve member into the closed position.

The regulating mechanism may be a piston and cylinder device communicating with the outlet chamber in which the piston is biased to maintain the regulating valve assembly open. Alternatively, the regulating mechanism could be a diaphragm arrangement or any other suitable assembly by which a change in pressure is transduced into movement of an element.

The relief valve is effectively slaved to the regulating valve according to the invention. In one desirable form, the relief valve is mounted for movement with the movable member. The relief valve may also include a projection which is fixed relative to the valve body and is arranged to open the valve by engagement with a component thereof when the pressure at the outlet exceeds the predetermined magnitude. Desirably, the spacing between the projection and the said component for a given outlet pressure is adjustable.

Preferably, the relief valve comprises a relief valve member and a relief valve seat, one of which is operably connected with the movable member of the pressure responsive mechanism for movement relative to the projection and engagement thereby to open the relief valve.

When the regulating mechanism comprises a piston and cylinder device, it preferably includes a hollow shaft extending away from the device to which is mounted the relief valve which is in communication with the outlet chamber by means of the hollow shaft. In this form the piston of the device is biassed by means of a helical spring acting between a collar formed on the said piston and a surface fixed relative to the valve body. The collar also usefully defines the limit of movement in one direction of the piston in the cylinder of the device.

If it is desired to be able to release more than one load, a manifold could be provided to supply pressure on the downstream side of the pressure regulating valve to a plurality of control valves, each arranged to control actuation of its own release or ejection mechanism. In this way, the vessel, the pressure regulating and the pressure relief valves can be common to a plurality of different pathways and thus to a plurality of ejection mechanisms.

Means may also be provided on the high pressure (unregulated) side of the pressure regulating valve for charging the pressure vessel, and for determining the pressure on the high pressure side. There may also be pressure relief means on the high pressure, or upstream, side of the pressure regulating valve, for instance a burst disc or a further pressure relief valve, and a vent valve on the downstream side of the regulator. Thus, both the upstream and downstream sides can be depressurised.

The invention also extends to a control valve per se and to a combined pressure regulating and relief valve per se.

BRIEF DESCRIPTION OF THE DRAWINGS

The invention may be carried into practice in various ways and, an embodiment will now be described, by way of example, with reference to the accompanying drawings, in which.

DETAILED DESCRIPTION OF THE PREFERRED EMBODIMENT

Figure 1:
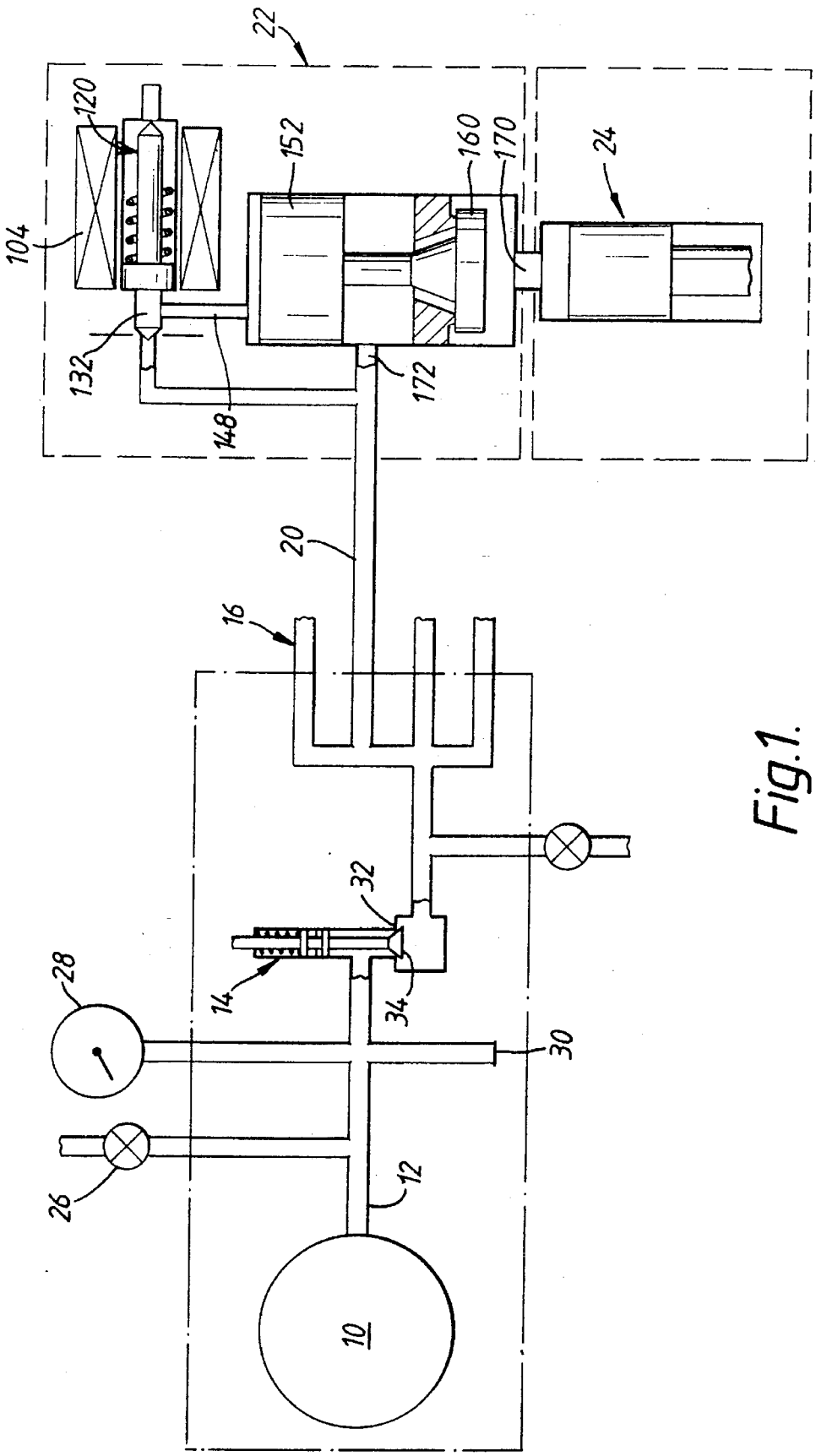
FIG. 1 is a schematic diagram of a gas operated release or ejection system according to the invention.

The ejection system of the illustrated embodiment comprises a pressure vessel 10 arranged to discharge via an outlet line 12 to a pressure regulating and relief valve 14 and thus to a manifold 16 supplying a plurality of ejection and release units 18, only one of which is shown. Gas entering each ejection release unit 18 via a line 20 passes to a solenoid actuated control valve 22 and then to one side of an ejection piston 24. Each of these components will now be described in greater detail.

The pressure vessel 10 is a standard two-part steel forged vessel suitable for pressures in the region of 3000 psi. A charging valve 26 in the outlet line 12 enables the vessel to be recharged as necessary. The stored pressure is indicated on a pressure gauge 28, preferably of the Bourdon type, and over-pressure protection on the high pressure side of the pressure regulating and relief valve 14 is provided by a burst disc 30. The disc 30 is arranged to rupture at a pressure greater than the design pressure of the system, but lower than the pressure the system is designed to be capable of withstanding without damage. If desired, the burst disc 30 could be replaced with a further suitable pressure relief valve (not shown).

Figure 2:
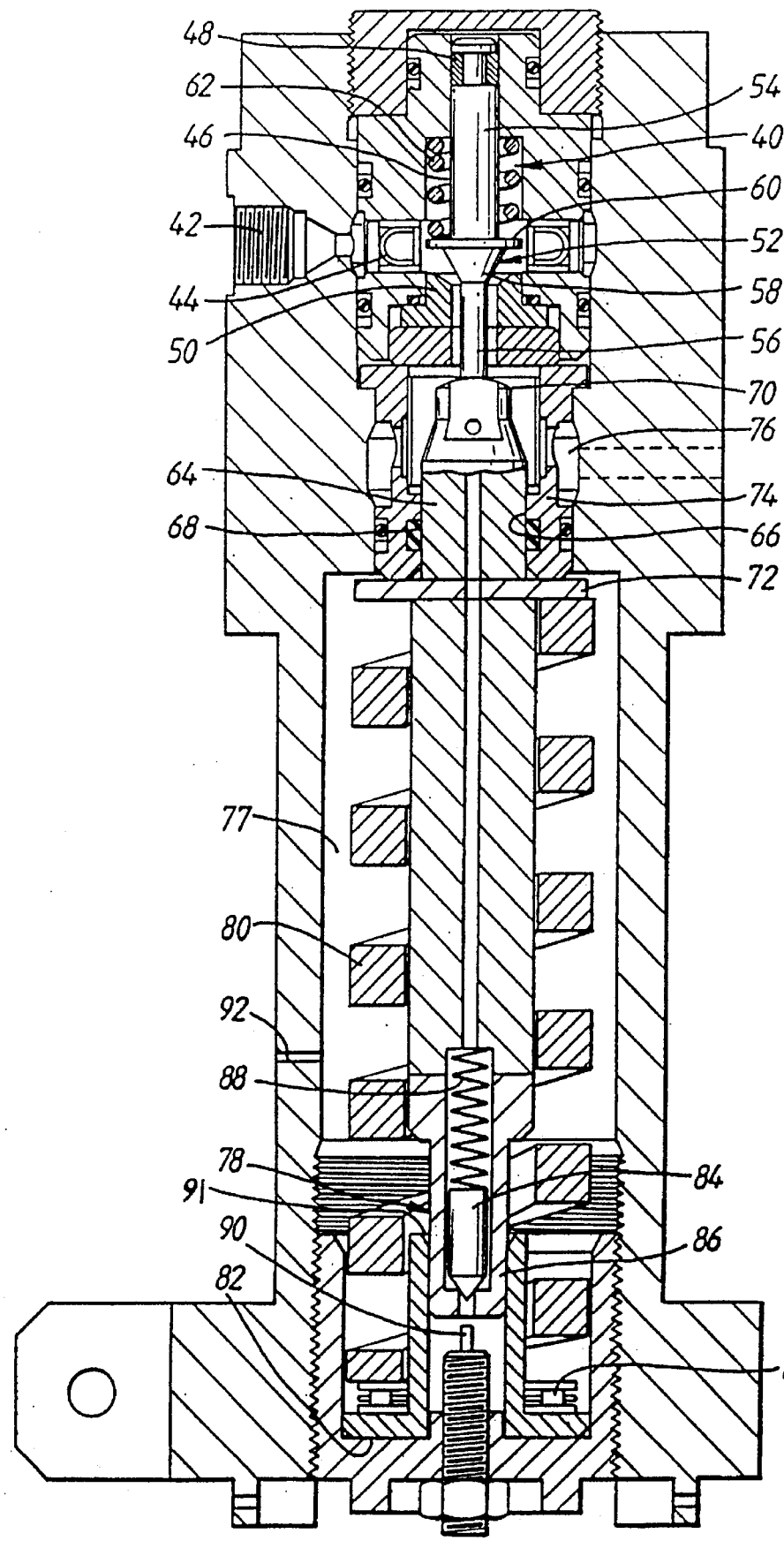
FIG. 2 is a cross-section of a combined pressure regulating and relief valve according to the invention.

The pressure regulating and relief valve 14 is illustrated in FIG. 2. The main body of the valve is made of aluminium alloy. In the regulating valve portion, a circular section chamber 40 communicates with a high pressure inlet port 42 through an air filter 44. The filter is designed to prevent the passage of particles having a dimension greater than about one thousandth of an inch. The chamber comprises a main compartment 46, the axial extent of which is defined at one end by an annular ledge leading to a narrower compartment 48, and, at the other end, by a valve seat 50 axially aligned with the chamber 40. A poppet valve member 52 has a hollow shank 54, which extends through the chamber 40 and a hollow nose 56 which projects through an aperture defined in the valve seat component 50. The two bores are connected through an interjacent frusto-conical valve seat engaging portion 58. The larger diameter end of the valve seat engaging portion 58 is formed with a radially projecting collar 60. A compression spring 62 is located between the annular ledge and the facing surface of the collar 60. The valve seat 50 has a tapered valve surface with which the poppet valve 52 cooperates.

The function of the compression spring is to urge the poppet valve 52 into engagement with the valve seat 50. This is assisted by a space on the side of the shank 54 opposite the valve seat engaging portion 58 which is also exposed to the pressure of the downstream side of the regulating valve through the bores in the poppet valve member. The shank is a tolerance fit in the narrower compartment 48 so that it acts as a piston in the cylinder of that compartment such that an increase in downstream pressure tends to assist in urging the valve to a closed position. The main operating surface upon which the regulated pressure acts is defined by a hollow shaft 64 sealingly engaged within a bore 66 by means of a seal ring 68. The shaft has a radiused nose 70 which is engaged by the end of the nose 56 projecting through the valve seat component 50.

Beyond the seal ring 68 the shaft has a radially projecting flange 72 which engages a ledge formed by an axial end surface of an insert 74 in the valve body, in which insert the seal 68 is located and through which the shaft 64 extends. The insert also defines an outlet port 76 for the gas at the regulated outlet pressure.

The length of the hollow shaft 64 below the collar 72 depends from the collar 72 within a chamber 77. The hollow shaft 64 has a pressure relief valve 78 venting into the chamber 77. A square section helical compression spring 80 extends between the collar 72 and a base 82 of the chamber. On assembly the base is screwed into the valve body. A roller thrust bearing race 83 is interposed between the spring 80 and the base 82 to minimise distortion of the spring which would influence the force it exerted by the tendency of the spring to be rotated as the base 82 is screwed into position.

The relief valve 78 has a needle valve member 84, having a conical end face, and a valve compartment 86 defining an aperture in which the conical end face is urged to sit to engage the corner of the surrounding wall of the compartment 86 by means of a compression spring 88. The compartment is in communication with the hollow centre of the shaft 64. An adjustable relief pin 90 is mounted in the base projecting up towards the aperture of the compartment 86.

The pressure at the inlet port 42 is applied to the area of the hollow shaft 64, sealed against atmosphere by the relief valve 78, on the inlet port side of the seal ring 68. An increase in pressure at the inlet port 42 will cause compression of the spring 80 and movement of the shaft 64 away from the inlet port 42. The movement of the shaft allows the valve member 52 to move towards its valve seat 50 until the pressure at the outlet port 76 is eventually isolated from the inlet when the valve is seated. In this way, the pressure at the outlet port 76 is regulated by the regulator valve.

The pressure at the outlet port 76 is communicated to the area surrounding the hollow nose 56 of the hollow shaft 64. As the pressure at the outlet port 76 rises, the hollow shaft 64 continues to move away from the outlet port 76.

In the event that the pressure at the outlet port 76 exceeds a predetermined acceptable upper limit, the shaft 64 will be moved so far as to cause engagement between the conical end of the relief valve member 84 and the stationary pin 90. Contact between the pin 90 and the valve member 84 causes the valve member 84 to move away from the compartment 86. This allows the gas in the outlet port to vent to atmosphere through the relief valve. As one of ordinary skill in the art will appreciate, a gap between the lower end of the shaft 64 and the surrounding bush provides fluid communication to the chamber 77. The portion of the valve body defining the chamber 77 is vented to atmosphere by a passage 92 in the body. After the relief valve has opened, the pressure in the outlet port 76 will drop and allow the shaft 64 to move and the relief valve to reseat itself.

The movement of the valve member is under the influence of the light spring 62. To assist its movement towards the valve seat component, the pressure at the inlet port is communicated to the chamber 48 above the shank 54 as has been stated above, the shank 54 is a close tolerance fit within its bore and acts as a piston in a cylinder to the inlet pressure, assisting movement of the valve member towards its seat when the shaft moves towards the relief valve.

To prevent gradual leakage from the high pressure to the low pressure side of the pressure regulating valve, the pressure regulating valve seat is of resilient or compliant material such as a polyimide such as Vespel (Trade Mark). This material is resilient enough to effect a good seal and yet rigid and stable enough to resist creep. The presence of creep will alter the valve opening characteristics and thus distort the operating pressures. This could affect the valve's performance adversely.

Rather than making use of a combined pressure regulating and relief valve 14, it would be possible to separate the two valves. Of course, in either arrangement the pressure relief valve will always be on the low pressure (regulated) side of the pressure regulating valve.

Figure 3:
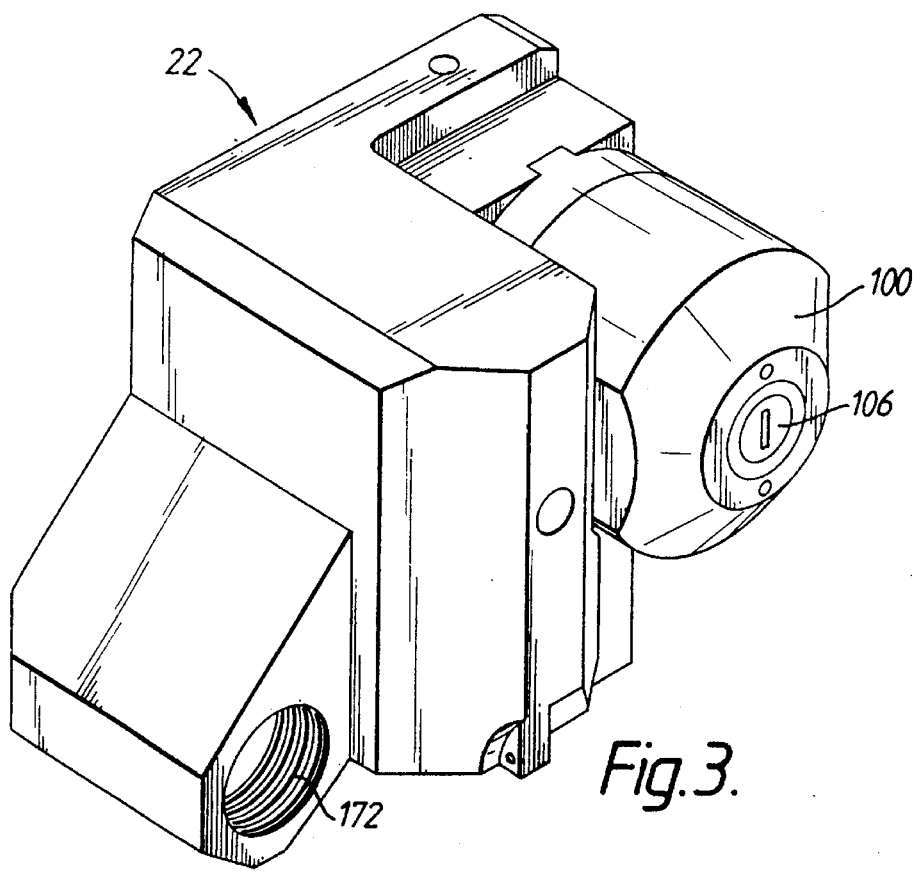
FIG. 3 is a perspective view of a control valve according to the invention.

FIG. 3 illustrates the body for the solenoid actuated control valve 22. When the solenoid actuator is energised, it supplies gas to the control valve 22 to actuate the ejection mechanism 24.

Figure 4:
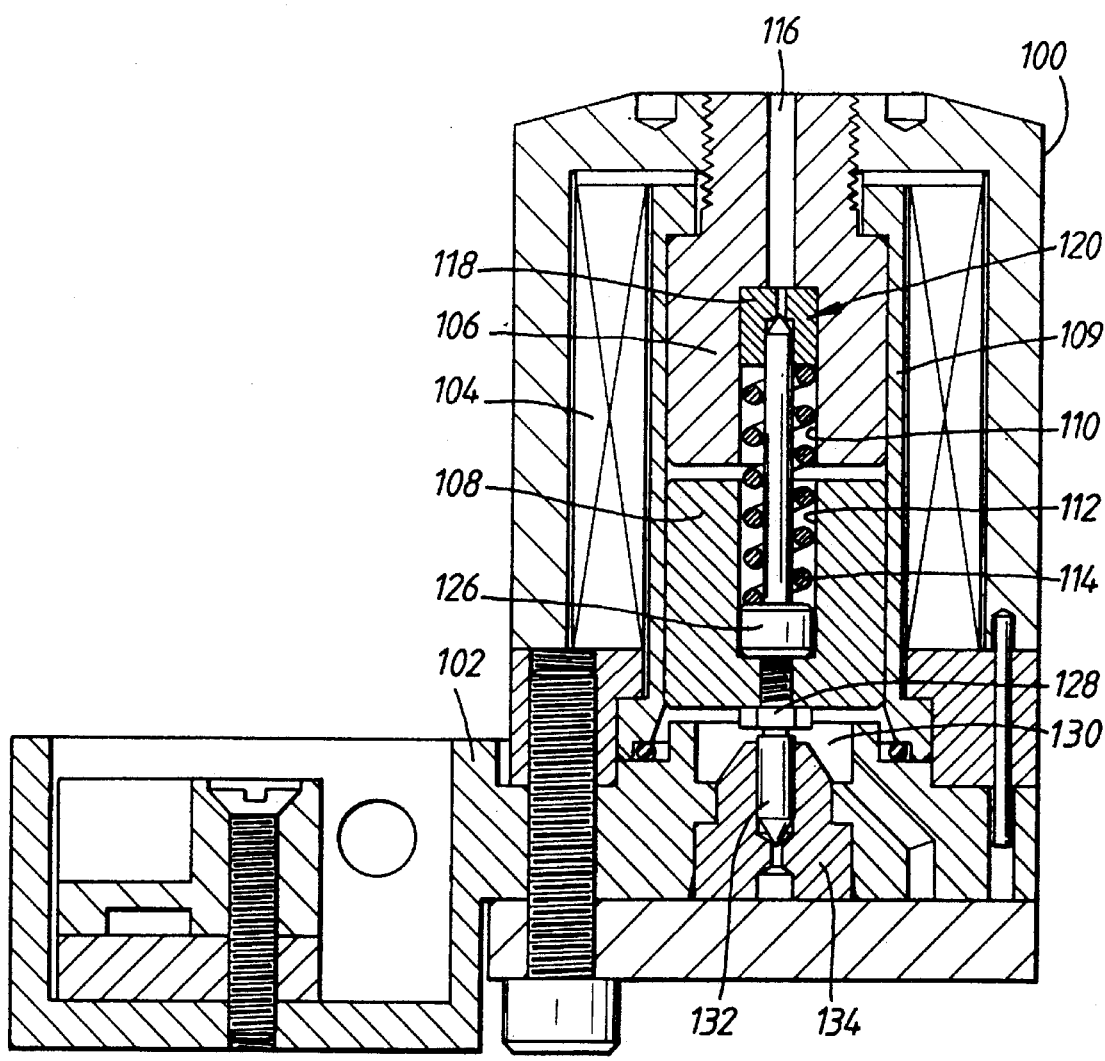
FIG. 4 is a cross-section through a solenoid actuator incorporated in the valve of FIG. 3.

Dealing firstly with the function of the solenoid valve shown in FIG. 4: an outer yoke 100 is mounted on an aluminium alloy base 102. An annular solenoid winding sleeve 104 is held in the yoke 100 surrounding fixed and moving circular section poles 106 and 108, respectively. The fixed pole 106 is screwed into an aperture in the end face of the yoke 100. The moving pole 108 is constrained to axial movement by a thin sleeve 109 between the pole and the winding sleeve 104. The poles are formed with opposed axial recesses 110 and 112. A helical compression spring 114 is mounted in the recesses to urge the poles apart. The recess 110 in the fixed pole 106 communicates with atmosphere through a narrow passage 116. A seat 118 for a vent needle valve 120 is located in the base of the recess 110 against which the spring 114 is braced.

The needle valve 120 has a conical end which is axially movable to engage the valve seat. The stem of the needle valve extends past the fixed pole 106 into the recess 112 in the moving pole 108. The end 126 of the stem is enlarged to position the stem axially in the recesses. The enlarged portion also acts as a surface on which the spring 114 bears. A screw 128 is received in a threaded passage in the end of the moving pole 108 adjacent the base of the recess 112.

The end of the adjustment screw projects into a gallery 130 and abuts the blunt end of a pilot needle valve 132. The conical end of the pilot needle valve is mounted in a pilot valve seat 134 which also defines a guide sleeve for the needle valve having channels (not shown) along its axial length for the passage of gas.

Gas at the controlled pressure is prevented from passing the normally closed needle valve 132 by its engagement with the pilot valve seat 134. In this de-energised state the poles 106 and 108 are spaced apart by the spring 114 a distance of about 1 mm allowing the gallery and the outlet from the pilot valve to be exposed to atmospheric pressure through the unseated vent needle valve 120. When an energising current is applied to the solenoid winding 104, the moving pole 108 is brought towards the fixed pole 110 until the vent valve 120 seals shut. The distance moved is around 0.7 mm. This movement also allows the pilot needle valve 132 to be moved away from its seat 134 to allow gas to pressurise the interior of the solenoid yoke and an outlet (not shown) for actuation of the ejection mechanism, as will be described below.

Figure 5:
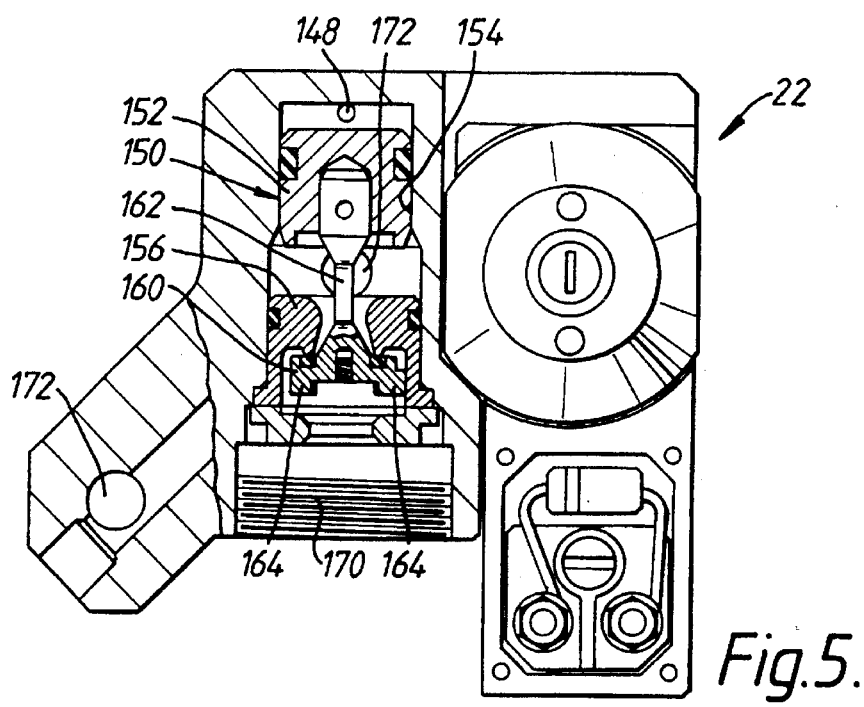
FIG. 5 is a cross-section of the valve in FIG. 3 showing detail of the valve assembly.
Figure 6:
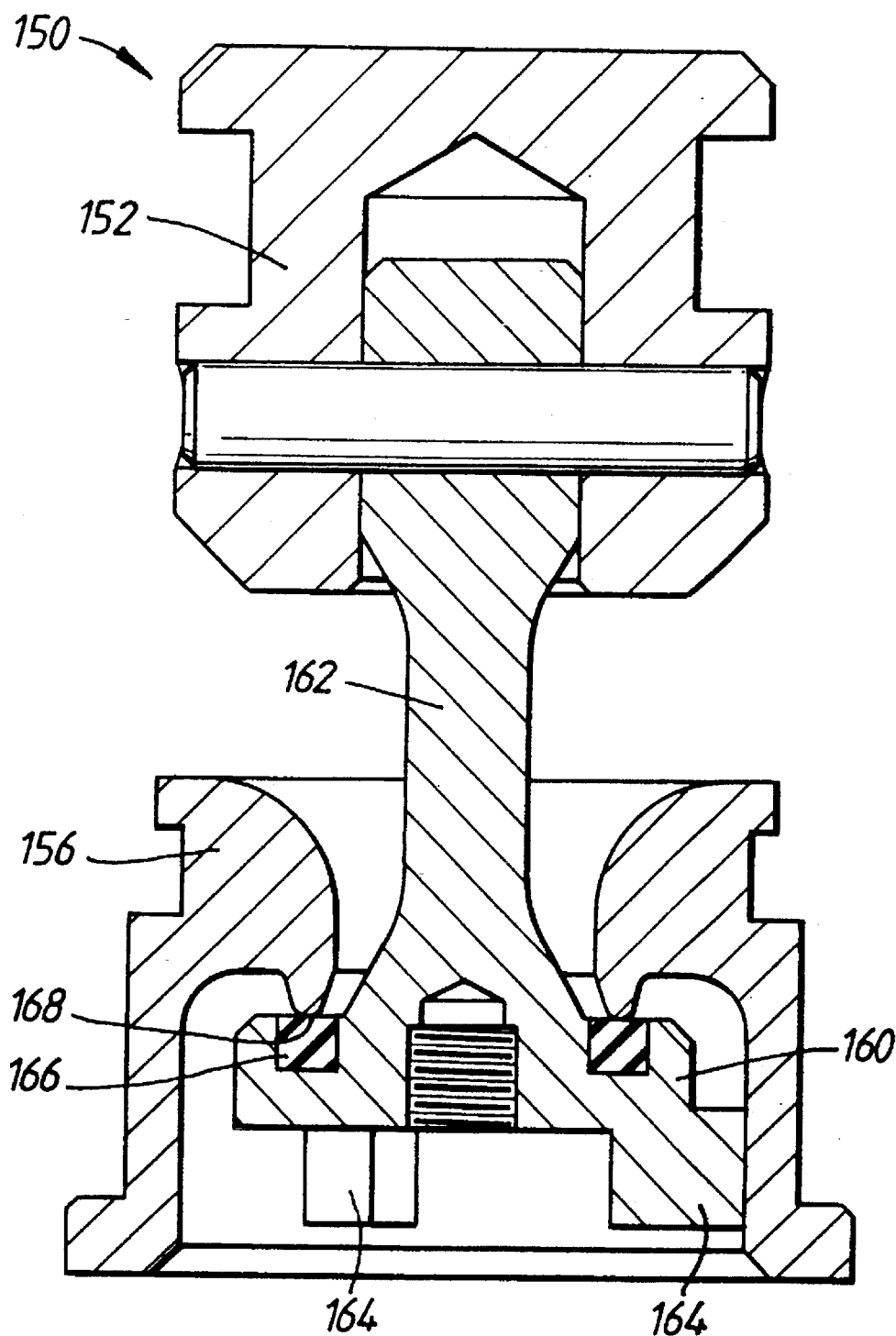
FIG. 6 is detail of the valve member illustrated in FIG. 5.

In the energised state of the solenoid, pressure at the outlet is applied, via a conduit 148 (see FIG. 5) to the auxiliary valve. This valve is located in another part of the body of the valve 22. It comprises a piston and valve assembly 150 which is mounted in a bore in the body. The assembly is shown in more detail in FIG. 6. The piston 152 rides in a first cylindrical portion 154 of the bore. A valve seat 156 of the assembly is mounted in a wider section of the bore adjacent the cylinder portion 154.

The piston 152 itself is connected to a valve member 160 by means of an integral connecting rod 162. The rod 162 projects through a central aperture within the valve seat 156 and defines a set of three angularly spaced spacing members 164 which maintain the axial position of the valve 160 relative to its valve seat 156. The region of contact on the valve member is defined by an annular insert 166 of a resilient material called Peek which faces the piston. The insert is arranged to engage an annular ridge 168 on the valve seat.

Downstream of the valve seat 156 is an outlet port 170 which is in communication with the ejection mechanism 24. A main inlet conduit 172 is formed in the body by which the regulated pressure gas is applied to the piston skirt side of the piston 150. Thus, the regulated pressure forces the piston 152 away from the valve seat maintaining the valve seat 156 and the valve member 160 in sealing engagement. The net sealing force is the pressure multiplied by the difference in area between the piston 152 and the sealing surface defined by the annular ridge 168. When the solenoid is energised to allow an actuating charge of gas past the pilot needle valve 132 and through its outlet port, it is fed via the conduit 148 to the chamber defined by the cylinder walls and the head of the piston 152. This pressure counteracts that acting on the other side of the piston so that the net force on the auxiliary valve is that acting on the valve member 160 causing it to open and allow actuating air past the valve member to the ejection mechanism 24.

The outlet pressure from the control valve 22 is supplied directly to the end surface of the ejection piston 24. Once the solenoid valve has been actuated and the piston 24 extended, the solenoid valve can then be deenergised and the piston returned to its closed position. The galleries in the valve are then communicated with the opened vent valve. To enable the piston 24 then to be moved back into its retracted position, as shown in FIG. 1, a leakage valve or vent (not shown) may be provided in the outlet 148 (see FIG. 1).

The operation of the system will now be described with reference to its use in ejecting a load from an aircraft. Before the aircraft takes off, the load is positioned ready for ejection with the ejection piston 24 in the retracted position shown in FIG. 1. The vessel 10 is charged with clean dry gas, for example air, to a pressure of perhaps 3000 psi. After passing through the pressure regulating valve 14, this pressure is reduced to perhaps 1600 psi at 20°. In common with most pressure regulating valves, however, there will be a tendency for the valve 14 to continue to pass gas at a very low rate even once the pressure on the downstream side has reached the nominal value of 1100 psi. Consequently, there will be a tendency for the downstream pressure gradually to creep upwards. Continually creeping downstream pressure is, however, prevented by means of the resilient seat on the pressure regulating valve, which ensures that the valve will 'lock-up' (i.e. entirely cease to pass gas) at a pressure only slightly above the nominal regulated pressure. The lock-up pressure might be, for example, 1700 psi.

The ejection mechanism is designed so that a desired ejection velocity of the load will be achieved by applying this lock-up pressure (1700 psi) to the ejection piston 24. Thus, when it is desired, in flight, to release the load the pilot actuates the solenoid valve 22 thereby applying the desired ejection pressure to the piston.

In a typical aircraft environment there may however be very substantial changes in ambient temperature, for example from −60° to +100° C. While changes in the ambient temperature will considerably affect the pressure on the high pressure side of the gas regulating valve 14, there will be much less impact on the low pressure side. Falling temperatures, and thus a tendency for the pressure on the low pressure side to fall, will be countered by more gas passing through the regulating valve 14; rising temperatures and a tendency for the pressure to rise will be countered by a release of gas to the atmosphere via the pressure relief valve. Thus, the pressure available for actuating the piston 24 can be maintained substantially constant, or at least maintained within given limits, regardless of external temperature or supply pressure changes.

I claim:

1. A gas operated release or ejection system comprising: a pressure vessel; a discharge pathway connected to said pressure vessel, said pathway including a pressure regulating valve, a pressure relief valve and a control valve; and a release or ejection mechanism connected to said pathway downstream of said control valve, said pressure relief valve being operable to release gas from said pathway when pressure upstream of said control valve reaches a predetermined value and to prevent pressure in said pathway upstream of said control valve from exceeding said predetermined value, wherein loads are ejected from the system, each load having an ejection velocity, the ejection velocity from load to load being constant when the pressure regulating valve and the pressure relief valve are maintained in a constant position.

2. A system as defined by claim 1 wherein said ejection system comprises an ejection piston.

3. A system as defined by claim 1 wherein said control valve is a solenoid actuated valve adapted to move between a closed position and an open position on receipt of an electrical signal.

4. A system as defined in claim 3 wherein said control valve has a control valve member so configured that a small movement of said member between its closed and open positions creates a large effective aperture in said pathway to the ejection mechanism in the open position whereby to allow a high rate of flow of gas.

5. A system according to claim 1 wherein said pressure regulating valve has a compliant or resilient valve seat.

6. A system according to claim 5 wherein said valve seat is made of a polyimide material.

7. A gas operated release or ejection system comprising: a pressure vessel; a discharge pathway connected to said pressure vessel, said pathway including a pressure regulating valve, a pressure relief valve and a control valve; and a release or ejection mechanism connected to said pathway downstream of said control valve, said control valve including a valve body and pressure responsive means at least partially defining first and second chambers, said first and second chambers having first and second inlet ports, respectively, defined in said valve body, said first chamber having an outlet therefrom; a valve assembly adapted to control fluid flow from said first inlet port through said outlet by opening and closing said outlet, said valve assembly including a surface at least partially defining the first chamber and being actuated concurrently with movement of said pressure responsive means; and auxiliary valve means operable to communicate the pressure at said first inlet port to said second inlet port to permit movement of said pressure responsive means and to cause pressure on said surface of said valve assembly to open said outlet from said first chamber.

8. A system according to claim 7 wherein said pressure responsive means is a piston and cylinder arrangement.

9. A system according to claim 7 wherein said pressure responsive means is a bellows arrangement.

10. A system according to claim 7 wherein said valve assembly includes a valve member and a valve seat, said valve member engaging the valve seat by means of an engaging region that faces in the opposite direction to the control flow of fluid through said control valve.

11. A system according to claim 10 wherein said valve seat is an annular ridge which defines an outlet from said control valve.

12. A gas operated release or ejection system comprising: a pressure vessel; a discharge pathway connected to said pressure vessel, said pathway including a pressure regulating valve, a pressure relief valve and a control valve; and a release or ejection mechanism connected to said pathway downstream of said control valve, wherein said pressure regulating valve and said pressure relief valve are combined into a single assembly, wherein loads are ejected from the system, each load having an ejection velocity, the ejection velocity from load to load being constant when the pressure regulating valve and the pressure relief valve are maintained in a constant position.

13. A system according to claim 12 wherein said single assembly comprises a valve body defining an inlet port communicating with an inlet chamber upstream of a regulating valve assembly which includes a valve member and an associated valve seat, an outlet port communicating with an outlet chamber downstream of the valve assembly, the combination further including a regulating mechanism having a movable member responsive to changes in pressure at the outlet port for actuating the valve assembly to regulate the outlet pressure, and a relief valve associated with a regulating mechanism and communicating with the outlet chamber, which relief valve is actuable, by movement of the movable member of the regulating mechanism, to open when the pressure at the outlet exceeds a predetermined magnitude.

14. A system according to claim 13 wherein said valve assembly comprises a valve seat, defining a passage between the inlet and outlet chambers, and a valve member arranged to close by engaging the valve seat by its movement in the direction of fluid flow to the outlet chamber, the valve member having a projecting nose extending through said passage which is operably connected with the regulating mechanism.

15. A system according to claim 14 which includes biasing means biasing said valve member to the closed position.

16. A system according to claim 14 wherein said valve member has a hollow axially projecting piston extending in a direction opposite to that of said nose and defining, with a surrounding cylinder, a chamber exposed to the regulated outlet pressure to bias said valve member into the closed position.

17. A system according to claim 13 wherein said regulating mechanism is a piston and cylinder device communicating with the outlet chamber in which the piston is biased to maintain the regulating valve assembly open.

18. A system according to claim 13 wherein said relief valve is mounted for movement with said movable member.

19. A system according to claim 18 wherein said relief valve further includes a projection which is fixed relative to the valve body and is arranged to open the valve by engagement with a component thereof when the pressure at the outlet exceeds the predetermined magnitude.

20. A system according to claim 19 which includes means for adjusting the spacing between the projection and the said component for a given outlet pressure.

21. A system according to claim 18 wherein said relief valve comprises a relief valve member and a relief valve seat, one of which is operably connected with the movable member of the pressure responsive mechanism for movement relative to the projection and engagement thereby to open the relief valve.

22. A system according to claim 1 which includes a manifold connected between the downstream side of the pressure regulating valve and a plurality of said control valves, each arranged to control actuation of its own release or ejection mechanism.

23. A control valve comprising a valve body and pressure responsive means at least partially defining first and second chambers, said first and second chambers having first and second inlet ports, respectively, defined in said valve body, said first chamber having an outlet therefrom; a valve assembly adapted to control fluid flow from said first inlet port through said outlet by opening and closing said outlet, said valve assembly including a surface at least partially defining the first chamber and being actuated concurrently with movement of said pressure responsive means; and auxiliary valve means operable to communicate the pressure at said first inlet port to said second inlet port to permit movement of said pressure responsive means and to cause pressure on said surface of said valve assembly to open said outlet from said first chamber.

24. A control valve according to claim 23 wherein said valve assembly includes a valve member and a valve seat, said valve member engaging the valve seat by means of an engaging region that faces in the opposite direction to the control flow of fluid through said control valve.

25. A control valve according to claim 24 wherein said valve seat is an annular ridge which defines an outlet from said control valve.

26. A combined pressure regulating valve and pressure relief valve constituted by a single assembly comprising a valve body defining an inlet port communicating with an inlet chamber upstream of a regulating valve assembly which includes a valve member and an associated valve seat, an outlet port communicating with an outlet chamber downstream of the valve assembly, the combination further including a regulating mechanism having a movable member responsive to changes in pressure at the outlet port for actuating the valve assembly to regulate the outlet pressure, and a relief valve associated with a regulating mechanism and communicating with the outlet chamber, which relief valve is actuable, by movement of the moveable member of the regulating mechanism, to open when the pressure at the outlet exceeds a predetermined relief pressure, the relief valve being adjustable independently from the regulating valve assembly, so that the pressure at which the relief valve opens may be set independently from the pressure at which the valve member of the regulating valve assembly closes against its associated valve seat.

27. A combination according to claim 26 wherein said valve assembly comprises a valve seat, defining a passage between the inlet and outlet chambers, and a valve member arranged to close by engaging the valve seat by its movement in the direction of fluid flow to the outlet chamber, the valve member having a projecting nose extending through said passage which is operably connected with the regulating mechanism.

28. A combination according to claim 27 which includes biasing means biasing said valve member to the closed position.

29. A combination according to claim 27 wherein said valve member has a hollow axially projecting piston extending in a direction opposite to that of said nose and defining, with a surrounding cylinder, a chamber exposed to the regulated outlet pressure to bias said valve member into the closed position.

* * * * *